US010615602B2

(12) United States Patent
Terauchi et al.

(10) Patent No.: US 10,615,602 B2
(45) Date of Patent: Apr. 7, 2020

(54) POWER CONTROL SYSTEM AND METHOD, AND CONTROL DEVICE

(71) Applicant: SHARP KABUSHIKI KAISHA, Sakai, Osaka (JP)

(72) Inventors: Masatsune Terauchi, Sakai (JP); Hirosuke Miki, Sakai (JP); Ryuto Kobayashi, Sakai (JP); Kazuo Yamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 47 days.

(21) Appl. No.: 15/761,023

(22) PCT Filed: Aug. 3, 2016

(86) PCT No.: PCT/JP2016/072770
§ 371 (c)(1),
(2) Date: Mar. 16, 2018

(87) PCT Pub. No.: WO2017/051615
PCT Pub. Date: Mar. 30, 2017

(65) Prior Publication Data
US 2018/0262008 A1    Sep. 13, 2018

(30) Foreign Application Priority Data

Sep. 24, 2015    (JP) .................. 2015-187049

(51) Int. Cl.
*G06Q 50/06*    (2012.01)
*H02J 3/32*    (2006.01)
(Continued)

(52) U.S. Cl.
CPC ................ *H02J 3/32* (2013.01); *G06Q 50/06* (2013.01); *H02J 3/00* (2013.01); *H02J 3/381* (2013.01);
(Continued)

(58) Field of Classification Search
USPC .......................................................... 307/66
See application file for complete search history.

(56) References Cited

U.S. PATENT DOCUMENTS

2012/0249048 A1    10/2012 Nishibayashi et al.
2013/0270911 A1    10/2013 Baba et al.

FOREIGN PATENT DOCUMENTS

JP    2008-306832 A    12/2008
JP    2012-152093 A    8/2012
(Continued)

*Primary Examiner* — Rexford N Barnie
*Assistant Examiner* — Xuan Ly
(74) *Attorney, Agent, or Firm* — ScienBiziP, P.C.

(57) ABSTRACT

In a power control system, a control device acquires at least one of information about an external environment (result or predicted temperature) of a facility and information on a parameter associated with power consumption (production plan) in an internal environment of the facility and calculates a correlation between these pieces of information and actual consumed power. The control device predicts consumed power of the facility on the basis the correlation that is calculated and information such as predicted temperature and determines an upper limit set value of power supplied from an electrical grid to the facility on the basis of a result of the prediction. The control device supplies power charged in a storage battery to the facility when the consumed power of the facility exceeds the upper limit set value.

3 Claims, 8 Drawing Sheets

(51) Int. Cl.
*H02J 7/00* (2006.01)
*H02J 9/06* (2006.01)
*H02J 3/00* (2006.01)
*H02J 3/38* (2006.01)

(52) U.S. Cl.
CPC ............ *H02J 3/382* (2013.01); *H02J 7/0063* (2013.01); *H02J 9/061* (2013.01); *H02J 3/383* (2013.01); *H02J 2003/003* (2013.01); *H02J 2007/0067* (2013.01); *Y02E 40/76* (2013.01); *Y02P 80/11* (2015.11); *Y02P 90/50* (2015.11); *Y04S 10/545* (2013.01)

(56) References Cited

FOREIGN PATENT DOCUMENTS

| | | | |
|---|---|---|---|
| JP | 2012-205436 A | | 10/2012 |
| JP | 2014-147216 | * | 8/2014 |
| JP | 2014-147216 A | | 8/2014 |

* cited by examiner

| FACILITY IDENTIFICATION INFORMATION (163A) | INTERNAL ENVIRONMENT INFORMATION (PRODUCTION PLAN INFORMATION) | | |
|---|---|---|---|
| | DATE AND TIME (163B) | PRODUCTION TARGET (163C) | PRODUCTION NUMBER (163D) |
| 12345678 | 2016/5/5 | PRODUCT A | 750 |
| | | PRODUCT B | 100 |
| | 2016/5/6 08:00:00 ~ 17:00:00 | PRODUCT A | 800 |
| | | PRODUCT B | 80 |

FIG.4

| USE PERIOD | ACTUAL VALUE OF THE NUMBER OF TIMES OF CHARGING/DISCHARGING | THE GUARANTEED NUMBER OF TIMES OF CHARGING/DISCHARGING | GUARANTEE PERIOD |
|---|---|---|---|
| | STORAGE BATTERY PERFORMANCE INFORMATION | | |
| AAA (DAY) | BBBB (TIME) | CCCC (TIME) | DDD (DAY) |

POWER CONTROL SYSTEM AND METHOD, AND CONTROL DEVICE

TECHNICAL FIELD

This application claims priority based on Japanese Patent Application No. 2015-187049 filed on Sep. 24, 2015, the content of which is incorporated by reference herein in its entirety.

The present disclosure relates to power control, more specially, to a technique of controlling electric power supplied to a facility such as a factory by controlling charging/discharging of a storage battery.

BACKGROUND ART

Recently, for controlling energy consumption of a consumer who receives power supply, power supplied to a facility of the consumer has been managed by providing a storage battery in the facility. For example, a storage battery and a solar cell are provided in the facility of the consumer, and a power conditioner controls power supply from an electrical grid to the facility, charging/discharging of the storage battery, and supplying or selling of power generated by the solar cell to the facility. An electric power rate is constituted by, for example, a basic rate of power and an amount-of-electric-power rate (pay-per-use) which is determined in accordance with power usage. The basic rate of power is set in accordance with highest peak power of power consumed by the consumer in the past. Thus, a threshold is set so that a level of power consumed by the consumer is not higher than a certain level, and power stored in the storage battery is supplied to the facility in accordance with a comparison result obtained by comparing an amount of the power consumed by the consumer to the threshold, so that it is possible to level the peak demand of the power consumed by the consumer. As a result, it is possible for the consumer to achieve reduction of the electric power rate while suppressing consumption of the power supplied from the electrical grid. In addition, also for an electric power supplier (electric power company) having a power station or a substation, there is an advantage in that power supply is stabilized by leveling loads, for example.

As a technique of achieving reduction (peak cutting) in a level of maximum peak power, for example, Japanese Unexamined Patent Application No. 2008-306832 (PTL 1) describes a power storage system that is able to reliably perform peak cutting while suppressing a capacity of a storage device. According to the technique of PTL 1, the power storage system performs switching between causing a secondary battery to charge in a night-time power time zone and causing the secondary battery to discharge in a daytime power peak time zone. Furthermore, in a case of a state where the storage device does not need to discharge and the storage device has not fully charged in the peak time zone, the power storage system causes the storage device to perform a charging operation. As described above, according to the description of PTL 1, the charging operation is performed when there is a margin in power demand in the peak time zone and the storage device has not fully charged, so that the storage device is able to keep a state close to the fully charged sate as much as possible.

CITATION LIST

Patent Literature

PTL 1: Japanese Unexamined Patent Application Publication No. 2008-306832

SUMMARY OF INVENTION

Technical Problem

As described above, though the peak cutting is performed for leveling the power demand, when the storage battery is discharged frequently for the peak cutting and thereby a storage capacity of the storage battery is used up, there is a risk that the peak cutting fails and the basic rate of power which is determined by an amount of maximum peak power is increased. As a result, in a factory where a relatively large amount of power is consumed, for example, the basic rate increases and this results in an increase in production cost. Accordingly, in order to prevent the peak cutting from failing, a sufficiently high threshold is set to be compared with power consumption of the facility in some cases. On the other hand, when the threshold is set high, an opportunity to start discharging, for peak cutting, from the storage battery is reduced and an effect on leveling loads is reduced, resulting that power supply becomes unstable for the electric power company. That is, motivation of the electric power company to spread a peak cutting system may be reduced.

Accordingly, it is desirable that power is used in the facility while the peak of power demand is further leveled and the peak of power demand is controlled so as not to exceed maximum power that is able to be supplied by an electric power supplier. An object of the disclosure is to provide a technique capable of controlling power supply to a facility and thereby responding to requests of both a consumer and an electric power supplier.

Solution to Problem

A power control system according to an aspect controls power supply to a facility. The power control system includes: a storage battery that is provided in the facility, and that is charged upon reception of power supply and discharges charged power to supply power to the facility; memory that stores an actual value of consumed power of the facility; acquisition means that acquires at least one of information about an external environment of the facility and information on a parameter associated with power consumption in an internal environment of the facility; and supply control means that determines an upper limit set value of power supplied from an electrical grid to the facility on a basis of the information about the facility, Which is acquired by the acquisition means, and the actual value of the consumed power of the facility stored in the memory, and supplies the power charged in the storage battery to the facility when the consumed power of the facility exceeds the upper limit set value so that an upper limit of the power supplied from the electrical grid to the facility is within the upper limit set value.

According to another aspect, a method for controlling power supply to a facility is provided. A storage battery is provided in the facility. The storage battery is charged upon reception of power supply and discharges charged power to supply power to the facility. The method includes a step of acquiring, by a control device, at least one of information about an external environment of the facility and information on a parameter associated with power consumption in an internal environment of the facility and a step of determining, by the control device, an upper limit set value of power supplied from an electrical grid to the facility on a basis of the acquired information about the facility and an actual value of consumed power of the facility, and supplying the power charged in the storage battery to the facility when the consumed power of the facility exceeds the upper limit set value so that an upper limit of power supplied from the electrical grid to the facility is within the upper limit set value.

According to another aspect, a control device for controlling power supply to a facility is provided. A storage battery that is charged upon reception of power supply and discharges charged power to supply power to the facility is provided in the facility. The control device includes supply control means that controls power supply from the storage battery to the facility. The supply control means is configured to acquire an upper limit set value of power that is supplied from an electrical grid to the facility and determined on a basis of at least one of information about an external environment of the facility and information about an internal environment of the facility, and an actual value of consumed power of the facility, and supply the power charged in the storage battery to the facility when the consumed power of the facility exceeds the upper limit set value so that an upper limit of power supplied from the electrical grid to the facility is within the upper limit set value.

Advantageous Effects of Invention

According to an aspect, power is able to be used in a facility while a peak of power demand is further leveled and the peak of power demand is controlled so as not to exceed maximum power that is able to be supplied by an electric power supplier. Thereby, a consumer is able to achieve reduction of a basic rate of power. In addition, the electric power supplier is able to supply power more stably.

The foregoing and other objects, features, aspects, and advantages of the invention will become apparent from the following detailed description related to the invention, taken in conjunction with the attached drawings.

DESCRIPTION OF EMBODIMENTS

Hereinafter, embodiments of the invention will be described with reference to drawings. In the following description, the same reference signs are assigned to the same components. Names and functions thereof are also the same. Accordingly, detailed description thereof will be not repeated.

Embodiment 1

Figure 1:
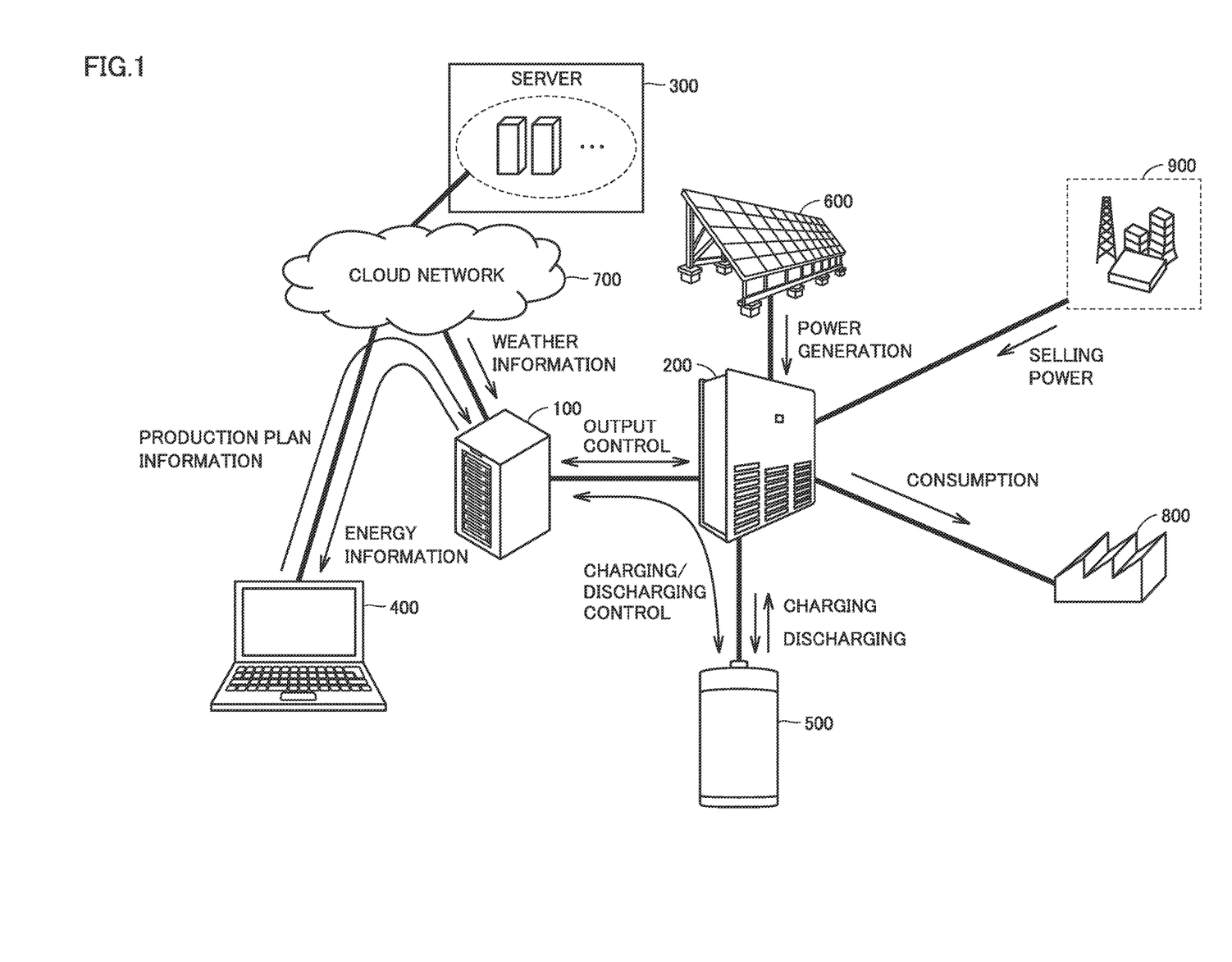
FIG. 1 is a block diagram schematically illustrating a configuration of a power control system 1 of Embodiment 1.

FIG. 1 is a block diagram schematically illustrating a configuration of a power control system 1 of Embodiment 1. In the power control system 1, a control device 100 controls power supply to a facility 800. The control device 100 receives, from a server 300, for example, information (available power supply information) on power that is able to be supplied by a power station 900 and controls grid-connected power to be supplied to the facility 800 in such a manner that the power to be supplied does not exceed the maximum power that is able to be supplied by the power station 900. The facility 800 is a facility where power is consumed and an example thereof includes a factory. An amount of power demand varies depending on a type of a facility.

Referring to FIG. 1, the power control system 1 includes the control device 100, a power conditioner 200, the server 300, an information terminal 400, a storage battery 500, a solar cell string 600, the facility 800, and the power station 900. The control device 100, the information terminal 400, and the server 300 are connected via a cloud network 700 so as to communicate with each other. The solar cell string 600, the power conditioner 200, and the storage battery 500 are arranged, for example, near the facility 800 (for example, arranged outdoors in the facility 800). The solar cell string 600 includes a plurality of solar cell modules. The solar cell string 600 supplies, to the power conditioner 200, power that is generated by a photoelectric effect upon reception of sunlight. The storage battery 500 is provided in the facility 800, charged by power supplied from the power conditioner 200, and discharges the charged power to thereby supply power to the facility 800 by the power conditioner 200.

A distribution board, a multi-circuit CT (Current Transformer) sensor, power consuming equipment, and other equipment are arranged indoors in the facility 800. An actual value of power consumption in the facility 800 is calculated by, for example, the server 300 on the basis of a detection result by the distribution board and the multi-circuit CT sensor that are arranged in the facility 800. The power consuming equipment is equipment that consumes power by operating in an internal environment of the facility 800, and an example thereof includes production equipment that is provided inside a factory and produces a product.

The control device 100 is a computer system including a storage device. The control device 100 receives information about an external environment of the facility 800 from the server 300 via the cloud network 700. The information about the external environment of the facility 800 includes, for example, result data related to temperature at a position of the facility 800 and data (predicted temperature data) of temperature predicted at the position of the facility 800. Moreover, the control device 100 receives information about the internal environment of the facility 800 from the server 300 or the information terminal 400 via the cloud network 700. The information about the internal environment of the facility 800 includes, for example, operation result data of the power consuming equipment that is operated in the facility 800 and operation plan data indicating a planning content to operate the power consuming equipment. The operation plan data of the power consuming equipment includes, for example, when the facility 800 is a factory, information on a time zone during which a manufacturing machine for producing a product is operated, information about the planned number of products to be produced by the manufacturing machine, and other information. That is, the operation plan data of the power consuming equipment is information about magnitude of power consumed by the power consuming equipment.

The control device 100 acquires an actual value of power consumption in the facility 800 from, for example, the server 300 or the like and stores an acquired value in a memory or the like. The control device 100 acquires at least one of the information about the external environment of the facility 800 and the information about the internal environment of the facility 800 from the server 300 or the like and determines an upper limit set value (threshold), which indicates an upper limit of power supplied from an electrical grid to the facility 800, on the basis of the acquired information and the actual value of the power consumption in the facility 800. The control device 100 controls, when the power consumption of the facility 800 exceeds the upper limit set value, the power conditioner 200 to supply, to the facility 800, power that is charged in the storage battery 500 so that the upper limit of the power supplied from the electrical grid to the facility 800 is within the upper limit set value.

For example, the control device 100 estimates a relationship between temperature and the power consumption of the facility 800 on the basis of the result data related to temperature and the actual value of the power consumption of the facility 800. The control device 100 calculates a prediction value of the power consumption of the facility 800 on the basis of a result of the estimation and the predicted temperature data. The control device 100 determines the upper limit set value (for example, a given rate of a peak of the power consumption of the prediction value (which may be, for example, an amount of cutting designated by a user, or a fixed rate (for example, 90%) with respect to the prediction value of the power consumption)) on the basis of the calculated prediction value. The control device 100 supplies the power charged in the storage battery 500 to the facility 800 when the power consumption of the facility 800 exceeds the determined upper limit set value.

Moreover, for example, the control device 100 estimates a relationship between an operation result of the power consuming equipment and the power consumption of the facility 800 on the basis of the operation result data of the power consuming equipment of the facility 800 and the actual value of the power consumption of the facility 800. The control device 100 calculates a prediction value of the power consumption of the facility 800 on the basis of a result of the estimation and the operation plan data of the power consuming equipment. The control device 100 determines an upper limit set value on the basis of the calculated prediction value. The control device 100 supplies the power charged in the storage battery 500 to the facility 800 when the power consumption of the facility 800 exceeds the determined upper limit set value.

The storage battery 500 and the solar cell string 600 are connected to the power conditioner 200. The power conditioner 200 receives power supplied from the electrical grid and supplies the power to the facility 800. The power conditioner 200 has a function of converting direct current power generated by the solar cell string 600 into alternating current power that is able to be used in the facility 800. The power conditioner 200 supplies the power generated by the solar cell string 600 to the facility 800 or the storage battery 500. The power conditioner 200 also performs selling of the power generated by the solar cell string 600 to an outside through a power meter. In addition, the power conditioner 200 controls charging to the storage battery 500 and discharging from the storage battery 500.

The control device 100 is able to control an operation of the power conditioner 200. The control device 100 causes the storage battery 500 to be charged by the power conditioner 200 with power corresponding to a total calculated result of power (an amount of power) that is predicted to be consumed in the facility 800 beyond the upper limit set value, before a time zone during which it is predicted that the power consumption exceeds the upper limit set value according to prediction data for the power consumption. For example, the power conditioner 200 causes the storage 500 to be charged with power at a predetermined time (for example, a midnight time zone during which an electric power rate is relatively low) for a day that corresponds to an amount of power which is predicted to be consumed beyond the upper limit set value according to the prediction data for the power consumption.

The power conditioner 200 compares the power consumption of the facility 800 with the upper limit set value and, when the power supplied from the electrical grid to the facility 800 reaches the upper limit set value, supplies the power charged in the storage battery 500 to the facility 800. Thereby, the power conditioner 200 is able to supply the power charged in the storage battery 500 to the facility 800 so that the power supplied from the electrical grid to the facility 800 does not exceed the upper limit set value (so that the upper limit of the power supplied from the electrical grid to the facility 800 is within the upper limit set value).

The server 300 is a server that collects predetermined information such as weather information and distributes the information to the control device 100. The server 300 also collects information about the power consumption of the facility 800 or the like and distributes the information to the control device 100.

The information terminal 400 is a terminal that is operated by, for example, a user of the facility 800 and transmits information about the internal environment of the facility 800 to the control device 100, the server 300, or the like.

<Configuration of Control Device 100>

Figure 2:
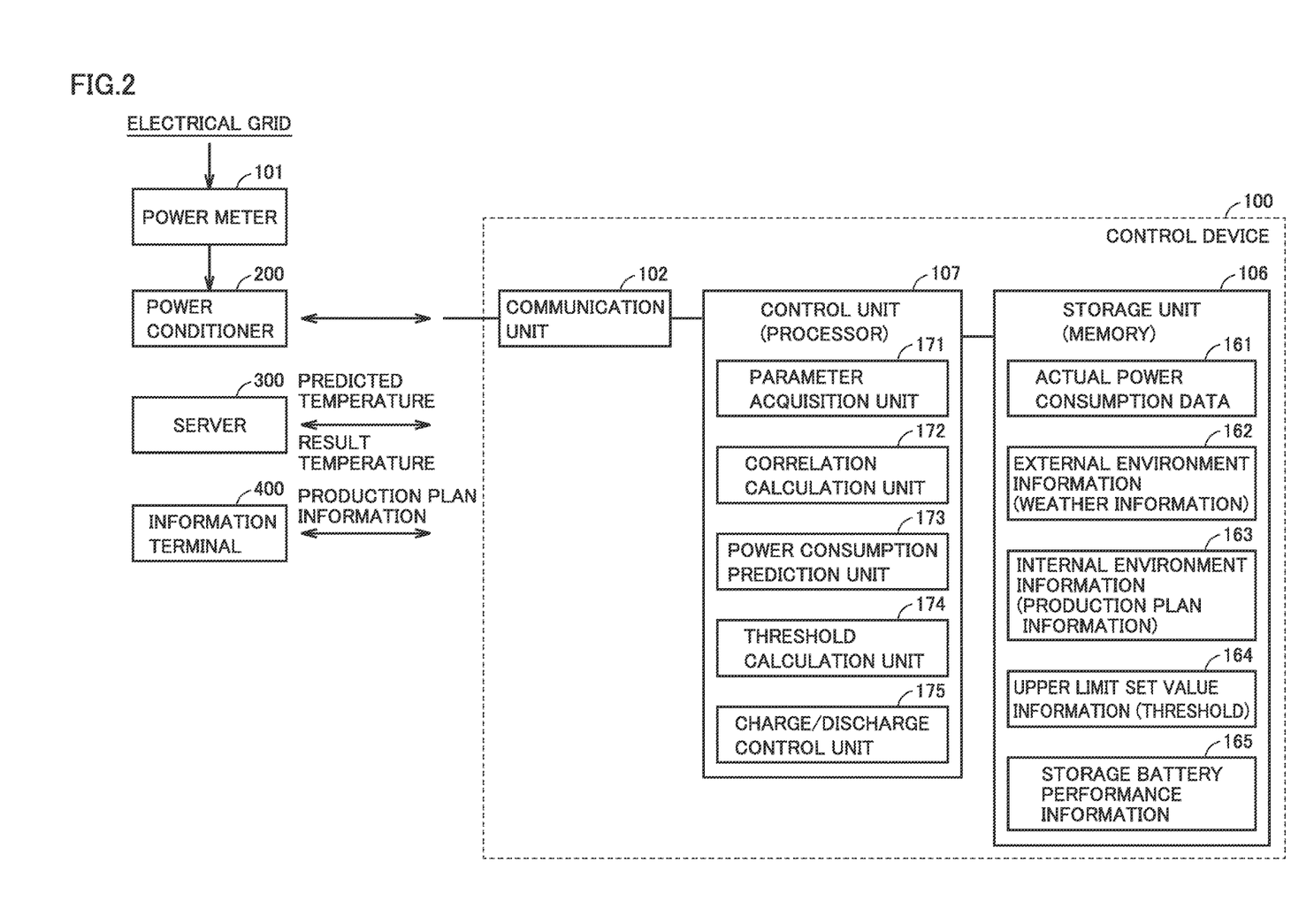
FIG. 2 is a block diagram illustrating a configuration of a control device 100.

FIG. 2 is a block diagram illustrating a configuration of the control device 100. With reference to FIG. 2, the control device 100 includes a communication unit 102, a storage unit 106, and a control unit 107.

The communication unit 102 is a communication interface that performs modulation/demodulation processing for the control device 100 to transmit or receive a signal to or from another communication equipment.

The storage unit 106 is constituted by a flash memory, a HDD (Hard Disk Drive), a RAM (Random Access Memory), or the like, stores a program that is used by the control device 100, and accumulates various kinds of data used by the control device 100. In an aspect, the storage unit 106 stores actual power consumption data 161, external environment information 162, internal environment information 163, upper limit set value information 164, and storage battery performance information 165.

The actual power consumption data 161 is data that indicates a history of power consumption related to the facility 800 which is managed by the control device 100. The actual power consumption data 161 indicates a history of entire power consumption of the facility 800, power consumption of the power consuming equipment provided in the facility 800, or the like.

The external environment information 162 is information about the external environment of the facility 800. For example, the external environment information 162 includes result data related to temperature at the position of the facility 800 and predicted temperature data. Note that, as the external environment information data 162, information of meteorological data, such as humidity or atmospheric pressure, other than information about temperature may be used.

The internal environment information 163 is information about the internal environment of the facility 800. For example, the internal environment information 163 includes information that indicates an operation result and an operation plan of the power consuming equipment that is operated in the facility 800. The power consuming equipment operated in the facility 800 is a production machine for producing a product when the facility 800 is a factory, for example. The operation result of the power consuming equipment includes, for example, the number of products which are produced when the production machine is operated, a time zone during which the production machine is operated. The operation plan of the power consuming equipment includes, for example, information of a time zone during which the production machine is planned to be operated, the planned number of products to be produced by the production machine, an expected weight of the products or the like. Furthermore, the internal environment information 163 includes information related to the operation plan such as the number of persons to operate the machine, the number of orders, the planned number of products to be sold, or the target number of products to be sold.

The upper limit set value information 164 is data in which an upper limit set value of power supplied from the electrical grid to the facility 800 is determined.

The storage battery performance information 165 is information that indicates performance of the storage battery 500. Information that indicates, for example, the number of times (guaranteed number of times) of charging and discharging of the storage battery 500, which is guaranteed by a performance test or the like, a time period (guarantee period) during which support for failure or the like is guaranteed after start of use of the storage battery 500, or other performance is prescribed for the storage battery 500 in advance. The storage performance information 165 includes information that indicates performance which varies with use of the storage battery 500, such as, an actual value of the number of times of executing the charging and discharging after start of use of the storage battery 500 or a time period (trial period) that has lapsed after the start of the use of the storage battery 500.

The control unit 107 reads a control program stored in the storage unit 106 for execution and thereby controls an operation of the control device 100. The control unit 107 is realized by, for example, one or more processors. The control unit 107 is operated in accordance with the program to thereby exert functions as a parameter acquisition unit 171, a correlation calculation unit 172, a power consumption prediction unit 173, a threshold calculation unit 174, and a charge/discharge control unit 175.

The parameter acquisition unit 171 acquires, from external equipment such as the server 300 or the information terminal 400, information such as the actual power consumption data 161, the external environment information 162, the internal environment information 163, and the storage battery performance information 165 which are used for the control device 100 to control an operation of the power conditioner 200.

The correlation calculation unit 172 performs calculation for estimating a correlation between temperature and power consumption of the facility 800 on the basis of the actual power consumption data 161 and the external environment information 162. In addition, the correlation calculation unit 172 performs calculation for estimating a correlation between an operation result of the power consuming equipment of the facility 800 and the power consumption of the facility 800 on the basis of the actual power consumption data 161 and the internal environment information 163.

The power consumption prediction unit 173 predicts a temporal change of the power consumption of the facility 800 on the basis of the entire power consumption of the facility 800, the actual value of the power consumption of the power consuming equipment provided in the facility 800, or the like. The power consumption prediction unit 173 calculates a prediction value of the power consumption of the facility 800 on the basis of the correlation between the actual value of the temperature and the power consumption of the facility 800, which is estimated by the correlation calculation unit 172, and predicted temperature data indicated by the external environment information 162. In addition, the power consumption prediction unit 173 calculates a prediction value of the power consumption of the facility 800 on the basis of the correlation between the operation result of the power consuming equipment of the facility 800 and the power consumption of the facility 800 and information on an operation plan of the power consuming equipment indicated by the internal environment information 163.

On the basis of the information and the actual power consumption data 161 that are acquired by the parameter acquisition unit 171, the threshold calculation unit 174 determines an upper limit set value (a threshold of the power consumption with which peak cutting is performed) of power to be supplied from the electrical grid to the facility 800. Specifically, the threshold calculation unit 174 determines the upper limit set value on the basis of the prediction value of the power consumption of the facility 800, which is predicted by the power consumption prediction unit 173. For example, the threshold calculation unit 174 may define a minimum value of the upper limit set value in order to perform peak cutting on the power consumption having a certain value or more. Alternatively, the threshold calculation unit 174 may set a certain rate (for example, 80% or the like) of the prediction value of the power consumption of the facility 800, which is predicted by the power consumption prediction unit 173, as the upper limit set value. As a result, the upper limit set value is able to be changed appropriately on the basis of information on the external environment such as temperature or information on the internal environment such as a production plan, and the peak cutting is performed more effectively so that leveling of the peak is realized. Thereby, power supply by an electric power supplier is further stabilized.

The charge/discharge control unit 175 controls the power conditioner 200 to control charging/discharging of the storage battery 500. The power conditioner 200 receives power supply from the electrical grid via a power meter 101. Specifically, for keeping the upper limit of the power supplied from the electrical grid to the facility 800 within the upper limit set value determined by the threshold calculation unit 174, the charge/discharge control unit 175 supplies the power charged in the storage battery 500 to the facility 800, when the power consumption of the facility 800 exceeds the upper limit set value.

<Data Structure>

Data structures of various kinds of data stored in the control device 100 will be described with reference to FIG. 3 and FIG. 4.

Figure 3:
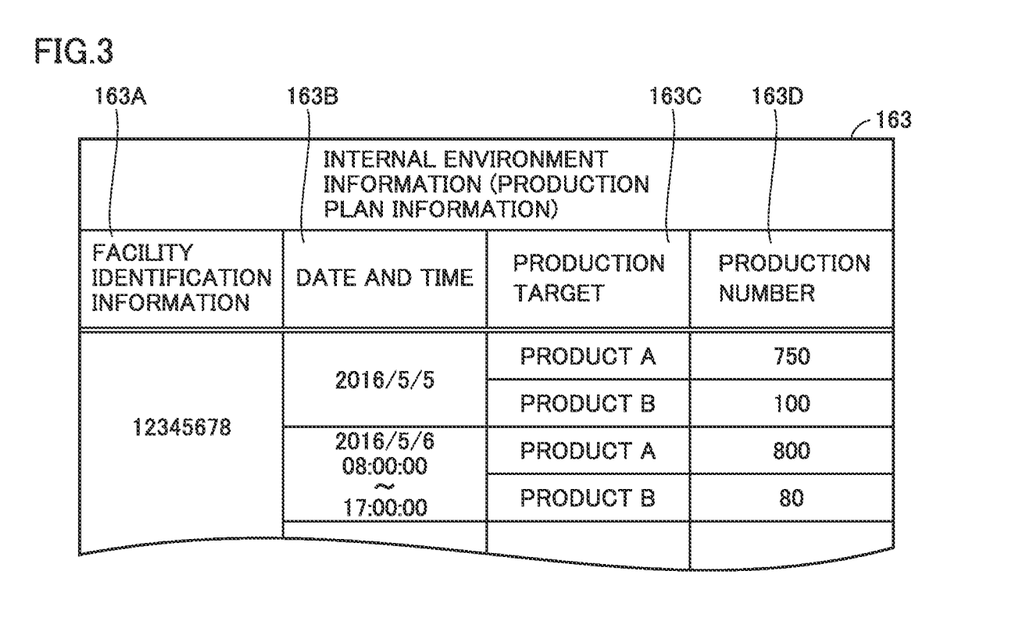
FIG. 3 is a diagram illustrating a data structure of internal environment information 163 stored in the control device 100.

FIG. 3 is a diagram illustrating a data structure of the internal environment information 163 stored in the control device 100. Referring to FIG. 3, in each record of the internal environment information 163, facility identification information 163A, a date and time 163B, a production target 163C, and production number 163D are associated with each other.

The facility identification information 163A is information for identifying each facility managed by the control device 100. The date and time 163B indicates a date and time when production prescribed as a production plan in the facility 800 is performed. The production target 163C indicates a target object that is produced in the facility 800 when the facility 800 is a factory. The production number 163D indicates the planned number of the produced products indicated by the production target 163C. That is, the internal environment information 163 is information that indicates which power consuming equipment (production machine) of the facility 800 is operated to produce which product to what extent (production number) and is associated with the power consumption in the facility 800.

Figure 4:
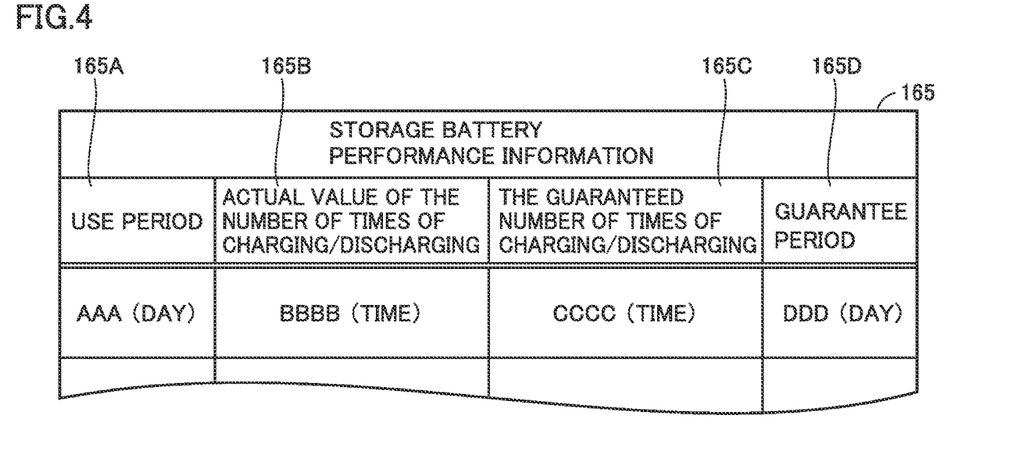
FIG. 4 is a diagram illustrating a data structure of storage battery performance information 165 stored in the control device 100.

FIG. 4 is a diagram illustrating a data structure of the storage battery performance information 165 stored in the control device 100. Referring to FIG. 4, in each record of the storage battery performance information 165, a use period 165A, an actual value of the number of times of charging and discharging 165B, the guaranteed number of times of charging and discharging 165C, and guarantee period 165D are associated with each other. The control device 100 updates the actual value of the number of times of charging and discharging 165B each time the storage battery 500 is charged or discharged by the power conditioner 200. Moreover, the control device 100 updates the use period 165A while the storage battery 500 continues to operate.

The use period 165A indicates a period (use period) that has lapsed after start of use of the storage battery 500. The actual value of the number of times of charging and discharging 165B indicates results of the number of times of executing charging and discharging of the storage battery 500. The guaranteed number of times of charging and discharging 165C indicates the number of times that the storage battery 500 is able to be charged and discharged and that is prescribed by a manufacturer of the storage battery 500 in advance. The guarantee period 165D indicates a period (guarantee period) during which use of the storage battery 500 is guaranteed and which is prescribed by the manufacturer of the storage battery 500 in advance.

<Operation>

An operation of the power control system 1 will be described.

Figure 5:
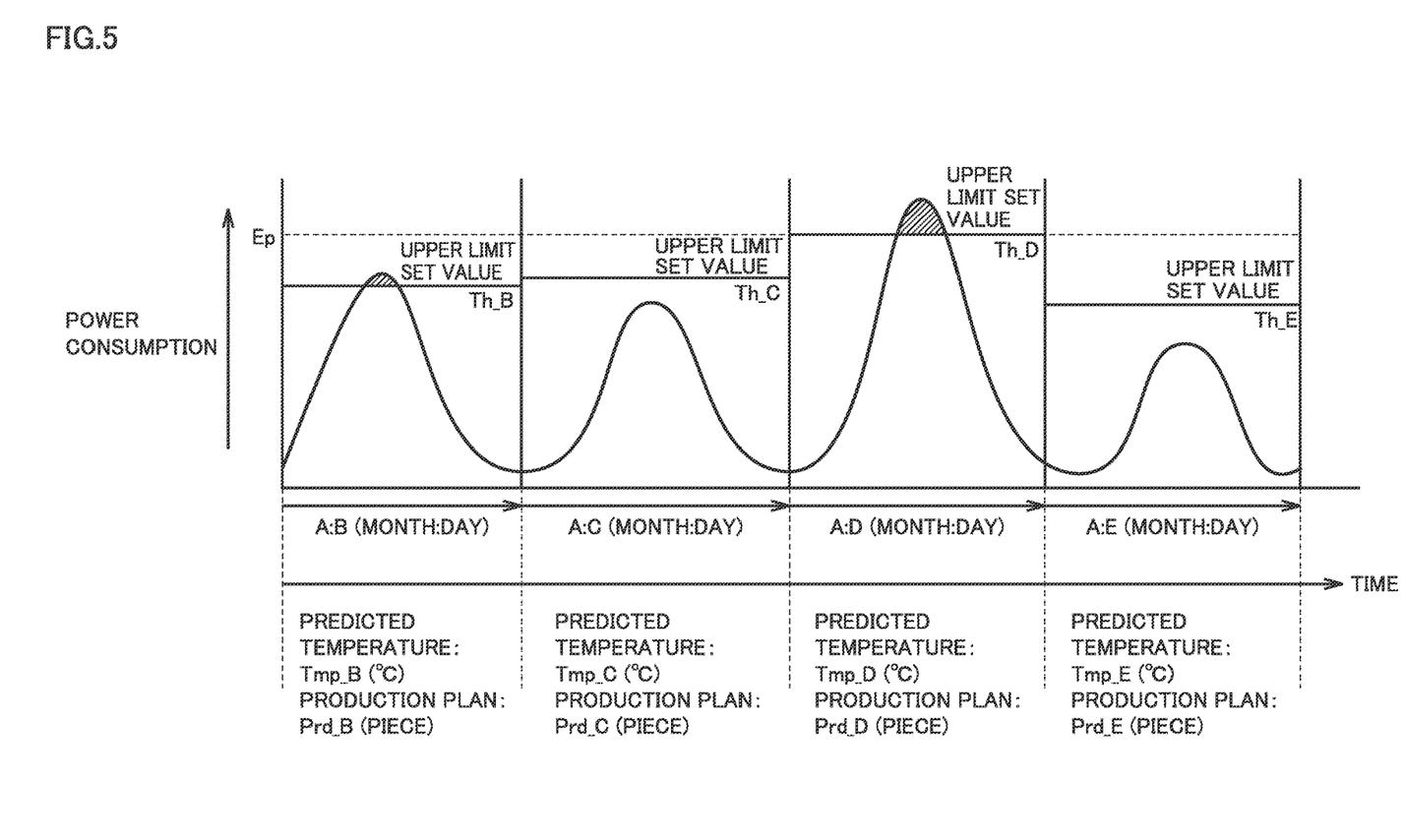
FIG. 5 is a diagram illustrating an operation by the control device 100 that controls charging/discharging of a storage battery 500 by setting an upper limit set value for peak cutting on the basis of at least one of information about an external environment of a facility 800 and information about an internal environment of the facility 800.

FIG. 5 is a diagram illustrating an operation in which the control device 100 controls charging/discharging of the storage battery 500 by setting an upper limit set value for peak cutting on the basis of at least one of the information about the external environment of the facility 800 and the information about the internal environment of the facility 800.

In FIG. 5, a horizontal axis indicates a lapse of time and a vertical axis indicates a prediction value or an actual value of the power consumption of the facility 800. In the present embodiment, the control device 100 sets an upper limit set value on the basis of at least one of the information about the external environment and information about the internal environment of the facility 800, for example, for each day, and performs charging/discharging control of the storage battery 500 on the basis of the upper limit set value that is set, but a frequency for setting the upper limit set value is not limited to setting by day.

The control device 100 functions as the correlation calculation unit 172, the power consumption prediction unit 173, the threshold calculation unit 174, and the charge/discharge control unit 175 to thereby function as supply control means. For example, on a date of "A:B (month:day)", the control device 100 acquires predicted temperature "Tmp_B(° C.)" as the external environment information 162 at the position of the facility 800 or a production plan "Prd_B(piece)" as the internal environment information 163 of the facility 800. In the control device 100, the power consumption prediction unit 173 generates prediction data of power consumption on the date "A:B (month:day)" and, the threshold calculation unit 174 determines un upper limit set value "Th_B". On the date "A:B (month:day)", the charge/discharge control unit 175 causes power to be discharged from the storage battery 500 to the facility 800 when the power consumption of the facility 800 exceeds the upper limit set value "Th_B". That is, prior to the discharging of the power from the storage battery 500 to the facility 800, the control device 100 causes the storage battery 500 to be charged with power necessary for the discharging.

In this manner, the control device 100 performs charging/discharging control of the storage battery 500 by setting the upper limit set value on the basis of at least one of the information about the external environment and information about the internal environment of the facility 800 for each day, so that leveling is able to be performed by performing peak cutting of the power supplied from the electrical grid to the facility 800, and power supply by the electric power supplier is further stabilized.

Figure 6:
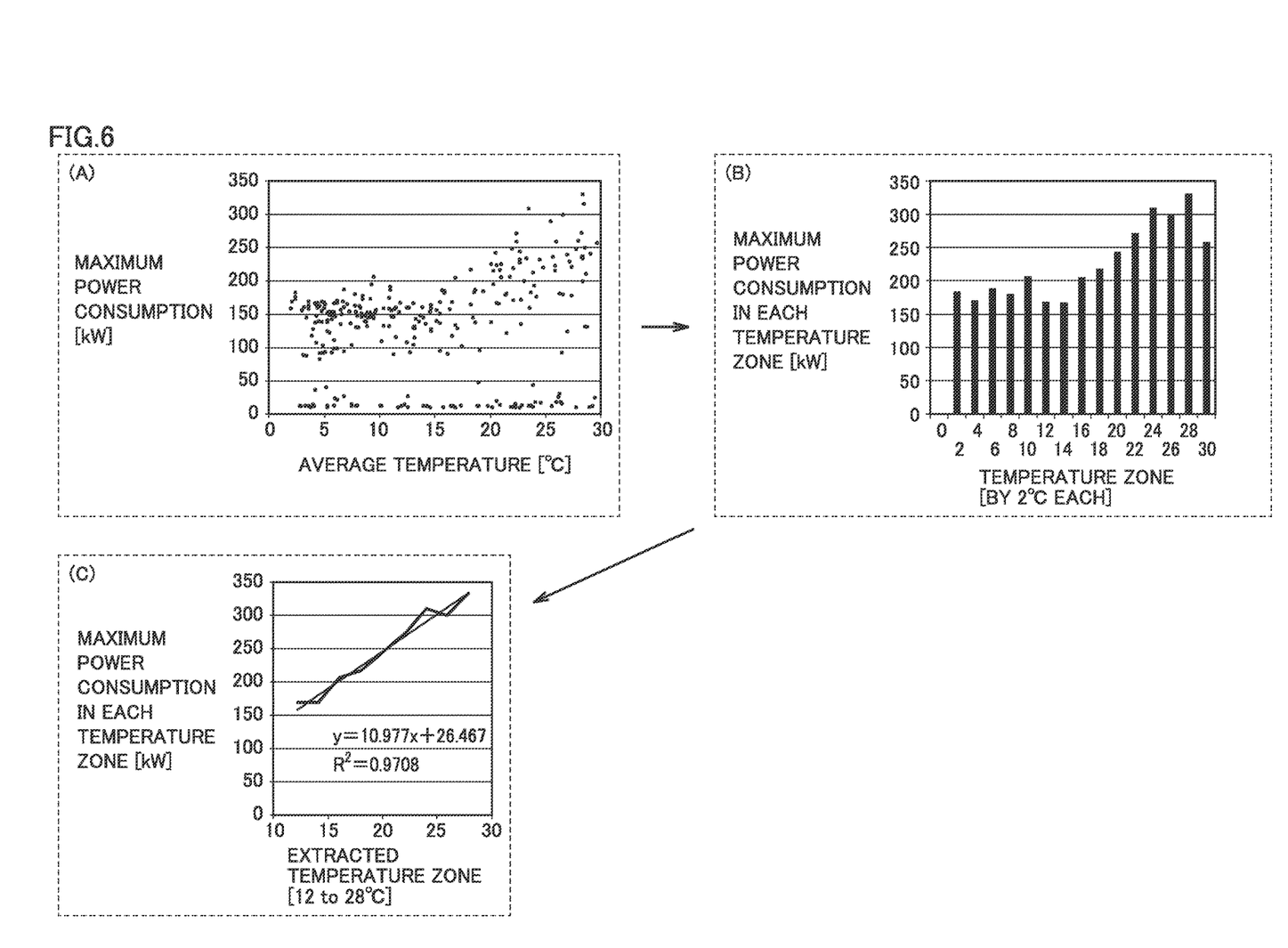
FIG. 6 is a diagram illustrating an example of processing by the control device 100 that calculates a correlation on the basis of actual power consumption data 161 and external environment information 162 and predicts power consumption on the basis of predicted temperature.

FIG. 6 is a diagram illustrating an example of processing in which the control device 100 calculates a correlation on the basis of the actual power consumption data 161 and the external environment information 162 and predicts power consumption on the basis of predicted temperature.

FIG. 6(A) is a plot diagram illustrating an actual value of power consumption indicated by the actual power consumption data 161 and an actual value of temperature data indicated by the external environment information 162. In FIG. 6(A), on the basis of a maximum value of power consumption at each temperature, an expression indicating a relationship between the temperature and the power consumption is derived. In an example of FIG. 6(A), the expression indicating the relationship between the temperature and the power consumption is obtained so that the power consumption at each temperature is exceeded. Note that, in the example of FIG. 6(A), though a value of the power consumption on the vertical axis indicates a maximum value (kW) of power consumption in a day, in addition thereto, a correlation between an average amount of power (kWh) in a demand time limit (for 30 minutes) and each temperature may be calculated.

FIG. 6(B) illustrates an example in which the control device 100 obtains a maximum value of power consumption in each temperature zone on the basis of the actual power consumption data 161 and the external environment information 162. In the example of FIG. 6(B), each temperature zone has a width of 2° C. The control device 100 uses a maximum value in each zone to predict the power consumption on the basis of the predicted temperature. The control device 100 may specify the width of the temperature zone as a range of use as illustrated in the example of FIG. 6(B). For example, in the example of FIG. 6(B), by using actual values of the power consumption in the zones from temperature of "12° C." to temperature of 28° C., prediction of the power consumption based on the predicted temperature is performed.

FIG. 6(C) indicates an example in which the width of the temperature zone is extracted as a range of use as illustrated in FIG. 6(B) and the control device 100 calculates a liner equation of peak power with respect to temperature. In FIG. 6(C), a horizontal axis indicates temperature and a vertical axis indicates a peak value of power consumption in each temperature zone. The control device 100 may calculate the equation (liner equation in the example of FIG. 6) of the peak power with respect to temperature in a predetermined width of the temperature zones (from the temperature of "12° C." to the temperature of "28° C." in the example of FIG. 6(C)). In FIG. 6(C), a polygonal line indicates results of the peak power of the power consumption with respect to the temperature. In FIG. 6(C), a straight line is a liner equation obtained by approximating the polygonal line to a straight line and the liner equation indicates a relationship between the peak power and temperature. The control device 100 may calculate a liner equation of the peak power in a temperature range in which a coefficient of determination $R^2$ of the approximate straight line that is calculated as the liner equation of the peak power is maximum. The control device 100 may calculate the equation indicating the relationship between the peak power and the temperature not only by using the liner equation, but also by using other polynomial equations or other relational equations.

The control device 100 predicts the power consumption of the facility 800 on the basis of information on the predicted temperature by calculating the correlation between the temperature and the power consumption as described above. In accordance with a result of the prediction of the power consumption of the facility 800, the control device 100 calculates an upper limit set value (Th) on the basis of a prediction value of a peak power value (Wp), maximum peak power (Wmax) in results, and a target cutting amount (Cp) which is specified by a user. That is, the control device 100 may calculate the upper limit set value by the following [expression 1].

Upper limit set value(threshold)=prediction value of peak of power consumption of facility 800×(1−target cutting amount/maximum peak power in result)

$Th=Wp\times(1-Cp/W\max)$   Expression 1

Note that, in the example of FIG. 6, an example in which the control device 100 calculates the upper limit set value on the basis of an actual value and a predicted value of the temperature and an actual value of the power consumption has been described. In addition, when the control device 100 calculates the upper limit set value on the basis of information about the internal environment of the facility 800, an expression indicating a correlation between a parameter such as the planned number of production and the power consumption is able to be obtained similarly, for example, by plotting a parameter such as an actual value of a production plan and power consumption, and it is possible to predict the power consumption on the basis of the expression and the planned number of production.

Figure 7:
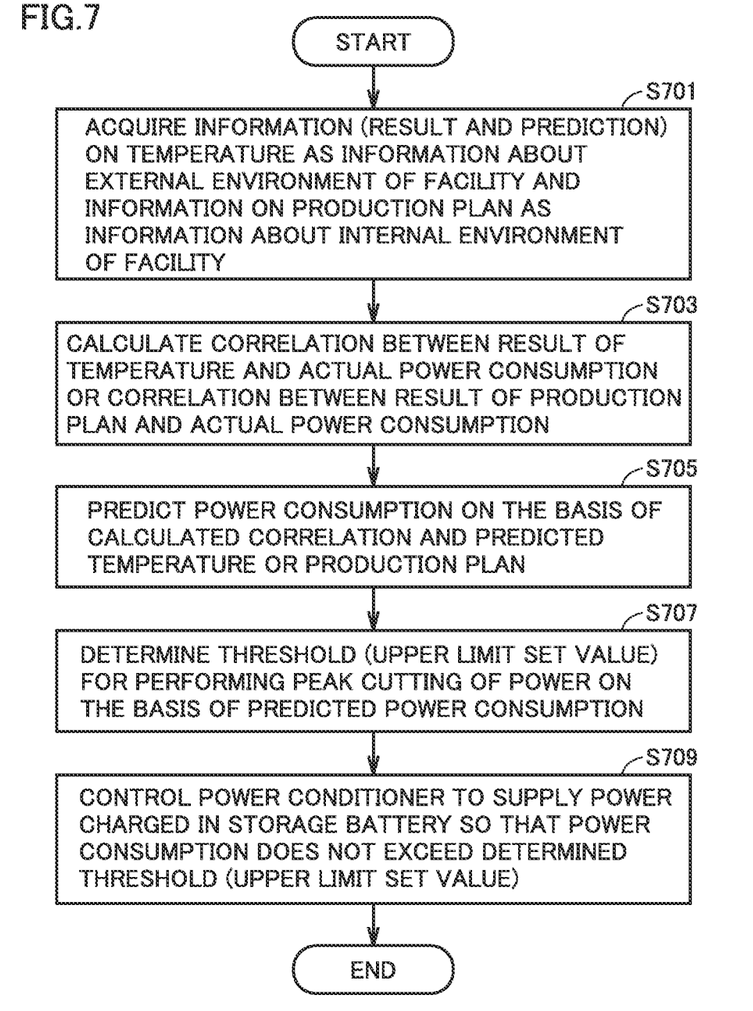
FIG. 7 is a flowchart illustrating processing by the control device 100 that controls charging/discharging of the storage battery 500 on the basis of at least one of the information about the external environment and the information about the internal environment of the facility 800.

FIG. 7 is a flowchart illustrating processing in which the control device 100 controls charging/discharging of the storage battery 500 on the basis of at least one of the information about the external environment of the facility 800 and the information about the internal environment of the facility 800. The control device 100 executes the processing illustrated in FIG. 7, for example, each day at a fixed time but not limited thereto.

At step S701, the control device 100 acquires, by the parameter acquisition unit 171, from the server 300 or the like, information on temperature at the position of the facility 800 (an actual value and a prediction value) as information about the external environment of the facility 800 or an operation result and an operation plan of the power consuming equipment of the facility 800 (for example, information on a production plan of a production machine) as information about the internal environment of the facility 800.

At step S703, the control device 100 calculates, by the correlation calculation unit 172, at least one of a correlation between the information about the external environment of the facility 800 and an actual amount of power consumption (a correlation between actual temperature and an actual amount of power consumption) or a correlation between the information about the internal environment of the facility 800 and the actual amount of the power consumption (a correlation between an actual production plan and the actual amount of power consumption).

At step S705, the control device 100 predicts, by the power consumption prediction unit 173, the power consumption of the facility 800 on the basis of an expression indicating the correlation calculated at step S703 and the predicted temperature (external environment information 162) or a production plan (internal environment information 163).

At step S707, the control device 100 determines, by the threshold calculation unit 174, an upper limit set value for performing peak cutting of power.

At step S709, the control device 100 controls, by the charge/discharge control unit 175, the power conditioner 200 to supply power charged in the storage battery 500 to the facility 800 so that power supplied from the electrical grid does not exceed the upper limit set value (threshold) determined at step S707.

Embodiment 2

A power control system of Embodiment 2 determines whether or not to control charging/discharging of the power conditioner 200 described in Embodiment 1 in accordance with a change in performance of the storage battery 500. Thereby, charging and discharging of the storage battery 500 is able to be controlled so that the guaranteed number of times of charging and discharging of the storage battery 500 is secured in a range of a prescribed guarantee period of the storage battery 500.

Figure 8:
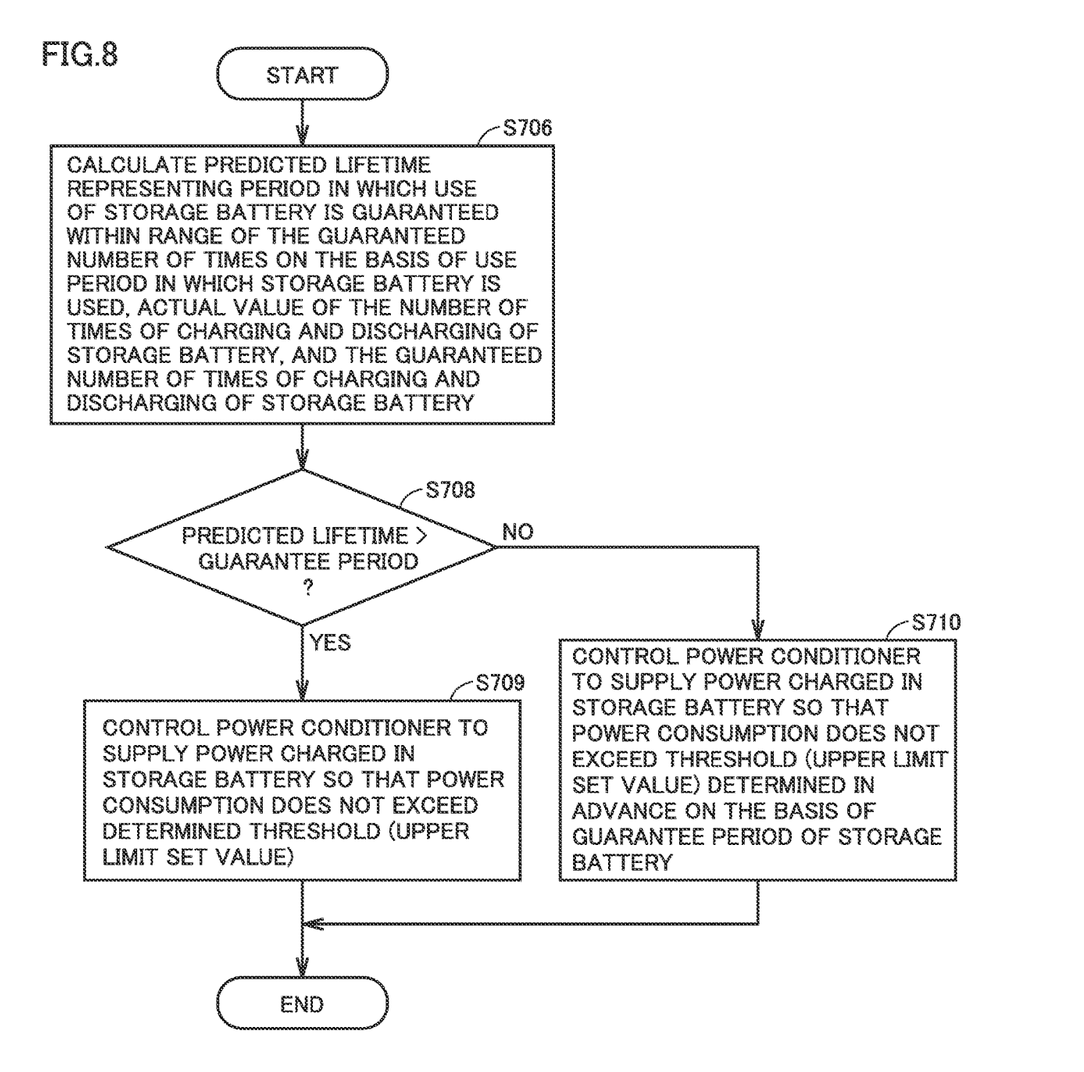
FIG. 8 is a flowchart illustrating an operation of the control device 100 in a power control system of Embodiment 2.

FIG. 8 is a flowchart illustrating an operation of the control device 100 in the power control system of Embodiment 2.

At step S706, the control device 100 calculates, by referring to the storage battery performance information 165, a predicted lifetime that represents a period in which use of the storage battery 500 is guaranteed within a range of the guaranteed number of times, on the basis of a use period in which the storage battery 500 is used, an actual value of the number of times that the storage battery 500 is charged and discharged, and the guaranteed number of times of charging and discharging of the storage battery 500. That is, the control device 100 calculates the predicted lifetime of the storage battery 500 on the basis of an expression: predicted lifetime of storage battery 500=use period of storage battery 500/actual value of the number of times that storage battery 500 is charged and discharged in past×the guaranteed number of times of charging and discharging.

At step S708, the control device 100 determines whether or not the predicted lifetime of the storage battery 500 exceeds the guaranteed period of the storage battery 500, and when the predicted lifetime exceeds the guaranteed period (YES at step S708), processing of step S709 is performed, and when the predicted lifetime does not exceed the guaranteed period (No at step S708), processing of step S710 is performed.

At step S710, on the basis of an upper limit set value that is set in advance to prevent the number of the times of charging and discharging of the storage battery 500 from being used up within the guaranteed period of the storage battery 500, the control device 100 controls the power conditioner 200 so that the power charged in the storage battery 500 is supplied to the facility 800 while preventing power supplied from the electrical grid to the facility 800 from exceeding the upper limit set value.

Embodiment 3

The control device 100 may execute the determination of the upper limit set value, and control of the charging/discharging of the storage battery 500 by the power conditioner 200 as described in Embodiment 1, for example, in a time zone indicated by a predetermined schedule. That is, in the time zone indicated by the predetermined schedule, the control device 100 may perform the peak cutting in accordance with the upper limit set value that is determined by the prediction of the power consumption based on the actual power consumption data 161, the external environment information 162, and the internal environment information 163, and in other time zones, the control device 100 may perform charging of the storage battery 500 or the like regardless of the prediction of the power consumption. Thereby, a state where the peak cutting is not able to be performed because the storage battery 500 is not charged is more likely to be avoided.

Alternatively, the control device 100 may perform the peak cutting with the upper limit set value determined by the prediction of the power consumption based on the actual power consumption data 161, the external environment information 162, and the internal environment information 163 in a time zone indicated by a first predetermined schedule, perform discharging at predetermined and fixed output in a time zone indicated by a second predetermined schedule, perform the peak cutting and the discharging simultaneously in a time zone included in both of the first schedule and the second schedule, and perform the charging of the storage battery 500 or the like regardless of the prediction of the power consumption in a time zone not included in any of the first schedule and the second schedule.

In addition, the control device 100 may perform the determination of the upper limit set value and control of the charging/discharging of the storage battery 500 by the power conditioner 200 as described in Embodiment 1 within a predetermined time limit. That is, during an operating in the peak cutting, the discharging is continued within the predetermined time limit, and when a residual capacity of the storage battery 500 is small, the discharging from the storage battery 500 to the facility 800 may be performed with a discharge capacity obtained by the residual capacity of the storage 500 and within the time limit.

CONCLUSION OF EMBODIMENTS

By performing the processing as described above, the power control system 1 is able to set an upper limit set value on the basis of information about the external environment of the facility 800, information about the internal environment of the facility 800, and other information in addition to the actual value of the power consumption and start the discharging of the storage battery 500 when the power consumption of the facility 800 exceeds the upper limit set value. Thus, by appropriately setting frequency of execution of the peak cutting, charging/discharging of the storage battery 500 is able to be controlled without causing failure of the peak cutting and it is possible for a consumer of power to reduce a basic rate of power. In addition, the electric power supplier is able to expect that an effect of leveling the peak of power is further enhanced.

A power control system according to the present embodiment is realized by a processor and a program executed thereon. The program by which the present embodiment is realized is provided by performing transmission/reception using a network, etc. through a communication interface.

Embodiments disclosed here are to be taken in all respects as exemplary only and are not to be interpreted as being limiting. The scope of the invention is not represented by the aforementioned description but by the scope of claims and is intended to encompass the meaning equal to the scope of claims and all variations falling within the scope of the claims.

REFERENCE SIGNS LIST

100 power control device, 200 power conditioner, 300 server, 400 information terminal, 500 storage battery, 600 solar cell string, 700 cloud network, 800 facility, 900 power station

The invention claimed is:

1. A power control system that controls power supply to a facility, the power control system comprising:
a storage battery that is provided in the facility and that is charged upon reception of power supply and discharges charged power to supply power to the facility;
memory that stores an actual value of consumed power of the facility;
acquisition means that acquires at least one of information about an external environment of the facility and information on a parameter associated with power consumption in an internal environment of the facility; and
supply control means that determines an upper limit set value of power supplied from an electrical grid to the facility on a basis of the information about the facility, which is acquired by the acquisition means, and the actual value of the consumed power of the facility stored in the memory, and supplies the power charged in the storage battery to the facility when the consumed power of the facility exceeds the upper limit set value so that an upper limit of the power supplied from the electrical grid to the facility is within the upper limit set value, wherein the storage battery has a guaranteed number of times of charging and discharging and a guarantee period of the storage battery that are determined, and the supply control means supplies the power charged in the storage battery to the facility, the supplying being configured such that a predicted lifetime representing a period in which use of the storage battery is guaranteed within a range of the guaranteed number of times is calculated on a basis of a use period in which the storage battery is used, an actual value of the number of times of charging and discharging of the storage battery, and the guaranteed number of times, and when the predicted lifetime calculated exceeds the guaranteed period determined for the storage battery, and when the consumed power of the facility exceeds the upper limit set value, the power charged in the storage battery is supplied to the facility so that the upper limit of the power supplied from the electrical grid to the facility is within the upper limit set value.

2. A control device for controlling power supply to a facility where a storage battery that is charged upon reception of power supply and discharges charged power to supply power to the facility is provided, the control device comprising supply control means that controls power supply from the storage battery to the facility, wherein the supply control means is configured to acquire an upper limit set value of power that is supplied from an electrical grid to the facility and determined on a basis of at least one of information about an external environment of the facility and information about an internal environment of the facility, and an actual value of consumed power of the facility, and supply the power charged in the storage battery to the facility when the consumed power of the facility exceeds the upper limit set value so that an upper limit of power supplied from the electrical grid to the facility is within the upper limit set value, the storage battery has a guaranteed number of times of charging and discharging and a guarantee period of the storage battery that are determined, and the supply control means supplies the power charged in the storage battery to the facility, the supplying being configured such that a predicted lifetime representing a period in which use of the storage battery is guaranteed within a range of the guaranteed number of times is calculated on a basis of a use period in which the storage battery is used, an actual value of the number of times of charging and discharging of the storage battery, and the guaranteed number of times, and when the predicted lifetime calculated exceeds the guaranteed period determined for the storage battery, and when the consumed power of the facility exceeds the upper limit set value, the power charged in the storage battery is supplied to the facility so that the upper limit of the power supplied from the electrical grid to the facility is within the upper limit set value.

3. A method for controlling power supply to a facility where a storage battery is provided and the storage battery is charged upon reception of power supply and discharges charged power to supply power to the facility, the method comprising:

a step of acquiring, by a control device, at least one of information about an external environment of the facility and information on a parameter associated with power consumption in an internal environment of the facility; and a step of determining, by the control device, an upper limit set value of power supplied from an electrical grid to the facility on a basis of the acquired information about the facility and an actual value of consumed power of the facility, and supplying the power charged in the storage battery to the facility when the consumed power of the facility exceeds the upper limit set value so that an upper limit of power supplied from the electrical grid to the facility is within the upper limit set value, wherein the storage battery has a guaranteed number of times of charging and discharging and a guarantee period of the storage battery that are determined, and the supplying the power charged in the storage battery to the facility is configured such that a predicted lifetime representing a period in which use of the storage battery is guaranteed within a range of the guaranteed number of times is calculated on a basis of a use period in which the storage battery is used, an actual value of the number of times of charging and discharging of the storage battery, and the guaranteed number of times, and when the predicted lifetime calculated exceeds the guaranteed period determined for the storage battery, and when the consumed power of the facility exceeds the upper limit set value, the power charged in the storage battery is supplied to the facility so that the upper limit of the power supplied from the electrical grid to the facility is within the upper limit set value.

\* \* \* \* \*